United States Patent [19]

Gakenholz

[11] Patent Number: 5,023,532
[45] Date of Patent: Jun. 11, 1991

[54] DRIVE MECHANISM FOR WINDSHIELD WIPER SYSTEMS ON MOTOR VEHICLES

[75] Inventor: Werner Gakenholz, Bietigheim-Bissingen, Fed. Rep. of Germany

[73] Assignee: SWF Auto-Electric GmbH, Bietigheim-Bissingen, Fed. Rep. of Germany

[21] Appl. No.: 469,602

[22] PCT Filed: Aug. 11, 1989

[86] PCT No.: PCT/EP89/00948
§ 371 Date: May 2, 1990
§ 102(e) Date: May 2, 1990

[87] PCT Pub. No.: WO90/02063
PCT Pub. Date: Mar. 8, 1990

[30] Foreign Application Priority Data

Aug. 19, 1988 [DE] Fed. Rep. of Germany ....... 3828176

[51] Int. Cl.[5] ............ H02K 23/20; H02P 7/00
[52] U.S. Cl. .................. 318/541; 318/DIG. 2; 310/148
[58] Field of Search .......... 318/292, 443, 444, 541, 318/542, DIG. 2; 15/250 C, 250.17; 310/121, 127, 128, 129, 130, 135, 136, 148, 151, 219, 229, 230, 233, 241, 245, 248, 249

[56] References Cited

U.S. PATENT DOCUMENTS

| 1,523,839 | 1/1925 | Rudenberg | 318/292 X |
| 1,857,202 | 5/1932 | Lee | 310/151 X |
| 2,151,678 | 3/1939 | Blankenbuehler et al. | 310/151 X |
| 3,310,722 | 3/1967 | Diello | 310/148 X |
| 3,335,305 | 8/1967 | Pasculle et al. | 310/148 |
| 4,500,819 | 2/1985 | Trusock et al. | 310/129 X |
| 4,704,552 | 11/1987 | Masterman | 310/148 |
| 4,843,286 | 6/1989 | Suriano et al. | 310/219 X |

FOREIGN PATENT DOCUMENTS

| 0037907 | 9/1913 | Fed. Rep. of Germany | 310/148 |
| 1272453 | 11/1986 | U.S.S.R. | 318/541 |
| 2178248 | 2/1987 | United Kingdom . | |

Primary Examiner—Bentsu Ro
Attorney, Agent, or Firm—Robert P. Seitter; J. Gordon Lewis

[57] ABSTRACT

A drive mechanism for windshield wiper systems on motor vehicles comprises a d.c. motor to be driven in at least two different speeds of operation. The motor includes a collector, a first and a second carbon brush substantially resting against the collector diametrically opposite each other, and a third carbon brush which rests against the collector between the first and the second carbon brush. The third carbon brush is set off at a particular angle relative to the second carbon brush. When the d.c. motor is operated in the first speed of operation the first and the second carbon brush is connected to the voltage source and when the d.c. motor is operated in the second speed of operation the first and the third carbon brush is connected to a voltage source. In order to achieve a substantial starting torque in the speed of the second speed of operation a fourth carbon brush is provided which relative to the third carbon brush rests against the collector at the other side of the connecting line between first and second carbon brush and may be connected to the voltage source in parallel to and jointly with the third carbon brush.

9 Claims, 3 Drawing Sheets

5,023,532

DRIVE MECHANISM FOR WINDSHIELD WIPER SYSTEMS ON MOTOR VEHICLES

BACKGROUND OF THE INVENTION

This invention relates to a drive mechanism for windshield wiper systems on motor vehicles and includes a two-speed d.c. motor having a collector and a plurality of carbon brushes.

The windshield wiper systems of modern motor vehicles typically are driven by permanent-magnet d.c. motors, which may be driven in two different speeds of operation. In order to switch on the two different speeds of operation a total of three carbon brushes are provided, of which two rest against the collector substantially diametrically. One of these carbon brushes is connected with the ground terminal of a voltage source. The other of these two carbon brushes is connected to the positive terminal of the voltage source, when the d.c. motor is to be driven at low speed in the first speed of operation. The third carbon brush rests against the collector between the first and the second carbon brush. It is thereby set off at a particular angle relative to the carbon brush which, in the first speed of operation, may be connected with the positive terminal, which angle is in general not larger than 90°. In order to driven the d.c. motor in the second speed of operation at a higher speed the third carbon brush is connected with the positive terminal of a voltage source instead of the second carbon brush.

A wiper system also is known in which the d.c. motor may be driven with three different speeds of operation. In this known system two further carbon brushes are arranged on one side of the neutral zone defined by the connecting line of the two carbon brushes connected with the voltage source in the low speed of operation, so that a total of three carbon brushes may be selectively connected with the positive terminal of the voltage source.

In a comparison with other solutions, in which different speeds are adjusted by variable series resistors or by a variable armature voltage, these known systems include considerable cost advantages. It is however true that the starting torque is smallest for the higher no-load speed selected speed of operation.

In order to circumvent this disadvantage it is known to insert a diode between the carbon brush of the lowest speed of operation and a carbon brush with a higher speed of operation, which diode provides a current flow from the lead to the carbon brush for the higher speed of operation to the carbon brush for the lowest speed of operation. However, this solution is rather expensive. Moreover it is difficult to dissipate the heat generated at the diode.

The present invention is based on the problem of developing a drive mechanism of the type described above in such a way that in the high speed of operation a starting torque of the d.c. motor is achieved which is at least substantially as great or greater than the starting torque in the low speed of operation.

SUMMARY OF THE INVENTION

This problem is solved according to the invention in that a drive mechanism of the type described is additionally equipped with a collector and a plurality of brakes and which are selectively coupled to the voltage source. Basically four carbon brushes preferably are provided. It has turned out that in a drive mechanism according to the present invention the starting torque in the higher speed of operation is much higher than in customary drives. It can even be higher than in the low speed of operation.

Advantageously, the third and fourth carbon brushes are to a different extent set off relative to the second carbon brush. In this manner a better symmetry of the sliding surface relative to the second carbon brush can be obtained. The sliding surfaces are thereby are disposed on the front faces of the third and fourth carbon brushes facing the collector between the former and the collector. The displacement will suitable by made no greater than that the after-running edge of the third carbon brush is to the same extent set off relative to the second carbon brush as the after-running edge of the fourth carbon brush.

In particular in drives in which the d.c. motor may be controlled in different directions of rotation it is however advantageous that the third and fourth carbon brush are set off at the same angle relative to the second carbon brush. If the gliding conditions between second carbon brush and collector and that between third and fourth carbon brush and collector are the same, a symmetry relative to the second carbon brush is obtained even if the angles of the third and fourth carbon brush are set off in the same way. The starting torque in the higher speed of operation can be adjusted to a desired value, for example to the value of the lower speed of operation, by an electric component having an electric resistance, which component is connected in series with the third and/or fourth carbon brush. Moreover, equalizing currents between the third and fourth carbon brush can be influenced thereby.

The use of two carbon brushes for the same speed of operation can have the result that the blocking time of the d.c. motor becomes too short in this speed of operation. It is therefore provided according to a further feature of the present invention that either the third or the fourth carbon brush may be automatically switched off, when the d.c. motor is blocked in the second or higher speed of operation. For this purpose a switching element which may be thermally operated is simply connected in series with the disconnectable carbon brush. The third and fourth carbon brush also can be directly interconnected.

Due to the fact that, when the d.c. motor is operated, the total current flowing through the third and fourth carbon brush in the higher speed of operation is not very much higher than the current flowing in the lower speed of operation through the second carbon brush, the third and fourth carbon brush can be narrower in the circumferential direction of the collector than the first and the second carbon brush.

If the d.c. motor is arranged to be operated in more than two speeds of operation, there are provided two further carbon brushes positioned at opposite sides of the connecting line between the first and the second carbon brush which further carbon brushes rest against the collector between the first and second carbon brush in a manner set off relative to the second carbon brush at an angle which differs from that of the third and fourth carbon brush and may be connected to the voltage source in parallel and jointly.

BRIEF DESCRIPTION OF THE DRAWING

Several embodiments of a drive mechanism according to the present invention will now be described in greater detail by reference to the accompanying drawing in which.

DETAILED DESCRIPTION

Figure 1:
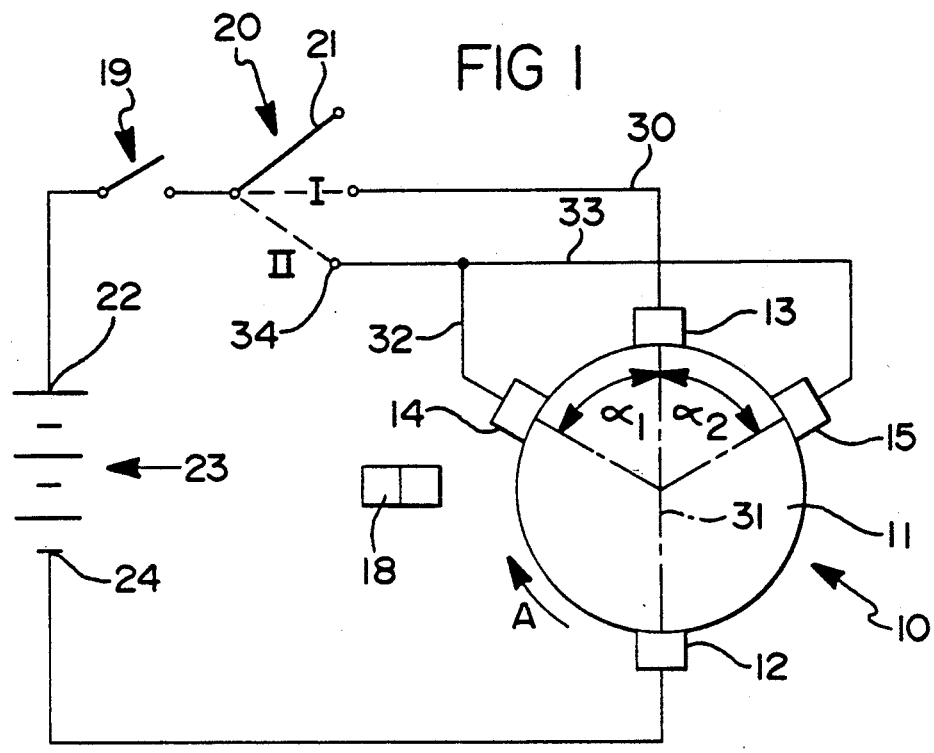
FIG. 1 shows a drive mechanism with a d.c. motor having two speeds of operation, in which the third and fourth carbon brush are set off at different angles relative to the second carbon brush.

The FIGS. 1 to 5 show drive mechanisms for windshield wiper systems on motor vehicles. In the drive mechanism there is included a d.c. motor 10, of which the collector 11 is indicated in the Figures, on the circumferential surface of which collector rest the carbon brushes 12, 13, 14 and 15 of FIGS. 1 to 4 and, in the embodiment according to FIG. 5, in addition the carbon brushes 16 and 17 also rest. As is indicated by the magnet 18 the d.c. motor 10 is a permanent-magnet motor. The motor 10 can be driven in several speeds of operation. An operating switch 20 serves to control the motor 10 and to select a speed of operation through a movable bridging contact 21 which may by way of the ignition switch be connected in an electrically conductive manner with the positive terminal 22 of a voltage source 23, the other terminal 24 of which is the ground terminal.

From FIGS. 1-5 it can be seen that the carbon brush 12 is permanently and invariably connected to the ground terminal 24. If, starting from the off position shown in the drawing, the operating switch is changed over into the first operating position designated 1, and with a closed ignition switch 19, positive potential is applied to the carbon brush 13 by way of the movable bridging contact 21 and a lead 30, which carbon brush 13 is located diametrically opposite to the collector 11 of the carbon brush 12. The connecting line between the carbon brushes 12 and 13 is shown as a dash-dotted line and has the reference numeral 31. If the d.c. motor 10 is controlled by way of the second carbon brush 13 the armature of the d.c. motor 10 rotates in the lowest speed of operation.

The carbon brush 14 is arranged in a set off manner relative to the carbon brush 13 at an angle α 1 between the two carbon brushes 12 and 13. Relative to the third carbon brush the fourth carbon brush 15 is positioned at the other side of the connecting line 31 and is set off relative to the carbon brush 13 at an angle α 2. The two carbon brushes 14 and 15 are connected to the same stationary contact 34 of the operating switch 20 by way of leads 32 and 33.

If the movable bridging contact 21 of the operating switch 20 is changed over into the operating position II, so that when the ignition switch 19 is closed, the two carbon brushes 14 and 15 are connected in parallel to each other and jointly to the positive terminal 22 of the voltage source 23. The armature of the d.c. motor 10 then rotates at a higher speed than in the speed of operation I. The selected arrangement of the carbon brushes 14 and 15 and their joint control has the result that the starting torque of the d.c. motor 10 in this higher speed of operation is greater than in the lower speed of operation.

In the embodiment according to FIG. 1 the two angles α 1 and α 2 differ to such an extent that upon rotation of the collector in the direction of arrow A the after-running edges of the carbon brushes 14 and 15 have the same distance from the carbon brush 13.

Figure 2:
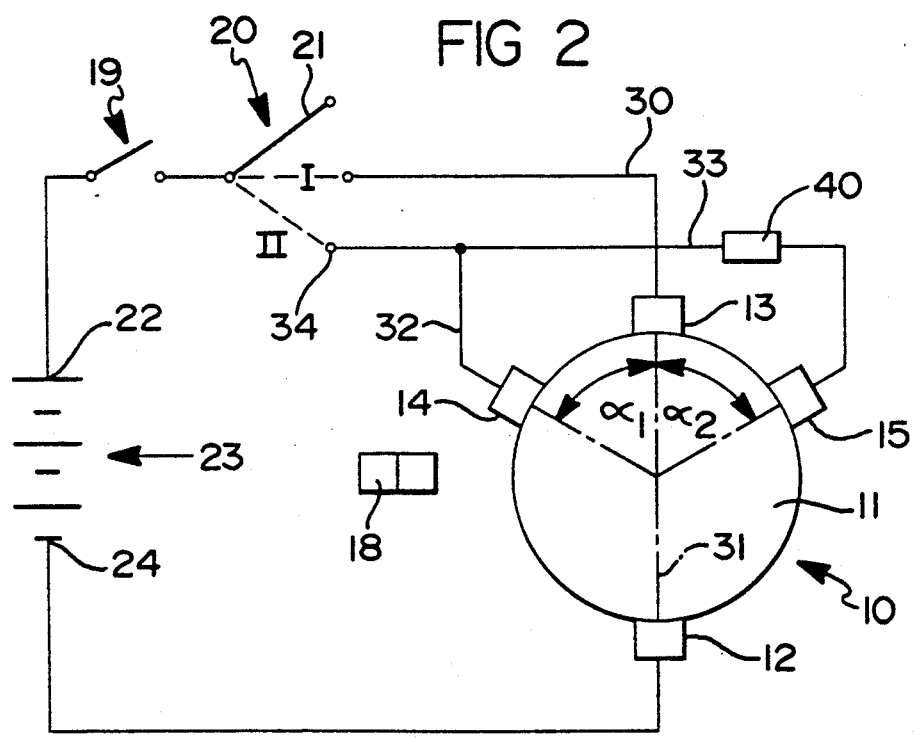
FIG. 2 is a second embodiment with the same angular displacement of third and fourth carbon brush and a switching element in the connecting lead to one of these two brushes.

While in the embodiment according to FIG. 1 the carbon brushes 14 and 15 are directly interconnected by way of their leads 32 and 33, in the supply lead of the embodiment according to FIG. 2, an electric component 40 having a low electric resistance is inserted in the lead to the carbon brush 15. In the speed of operation II the starting torque of the d.c. motor 10 can be adjusted by the component 40. Furthermore, equalizing currents between the carbon brushes 14 and 15 can be influenced. Moreover the angles α 1 and α 2 have the same size in the embodiment of FIG. 2. This completely symmetrical arrangement of the carbon brushes 14 and 15 relative to the connecting line 31 is of special advantage, if the d.c. motor 10 is driven in both directions of rotation.

Figure 3:
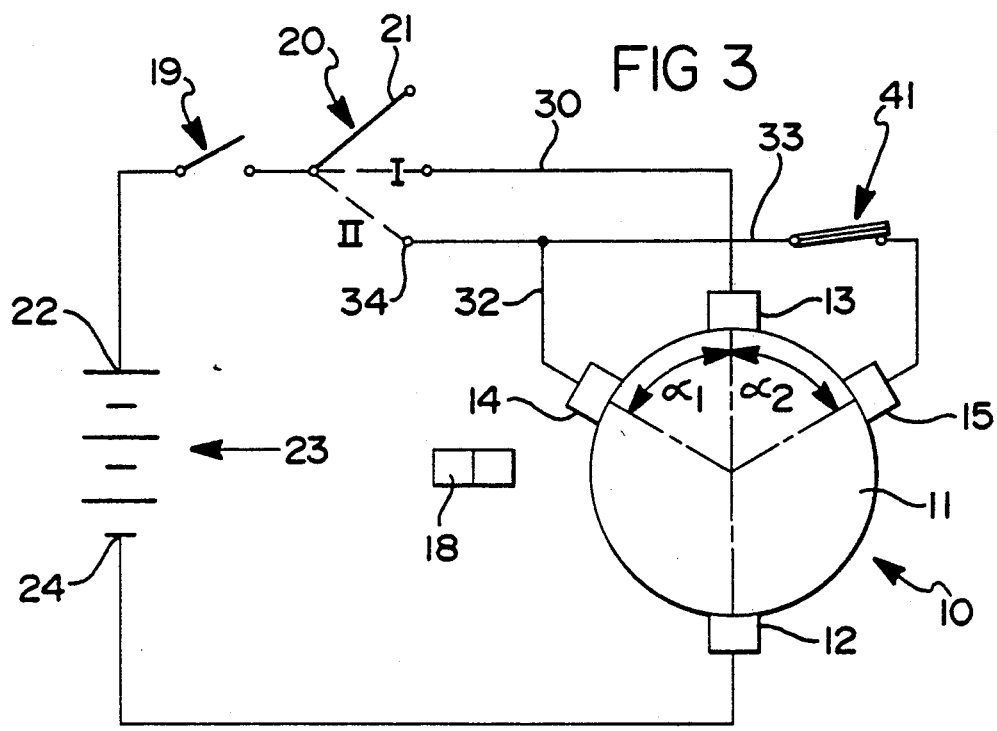
FIG. 3 is an embodiment similar to that of FIG. 2 having a thermal switch in the connecting lead to one of the two carbon brushes.

The embodiment of FIG. 3 differs from that of FIG. 2 in that a thermal switch is inserted in the lead 33 to the carbon brush 15. This measure accommodates considerable demands with regard to the blocking reliability of the d.c. motor 10. Due to the fact that the level of the current flowing through the carbon brushes 14 and 15 respectively is only half of the level of the current flowing through the carbon brush 12, a relatively inexpensive thermal switch can be used. The thermal switch 41 could also be inserted in the lead 32 to the carbon brush 14.

Figure 4:
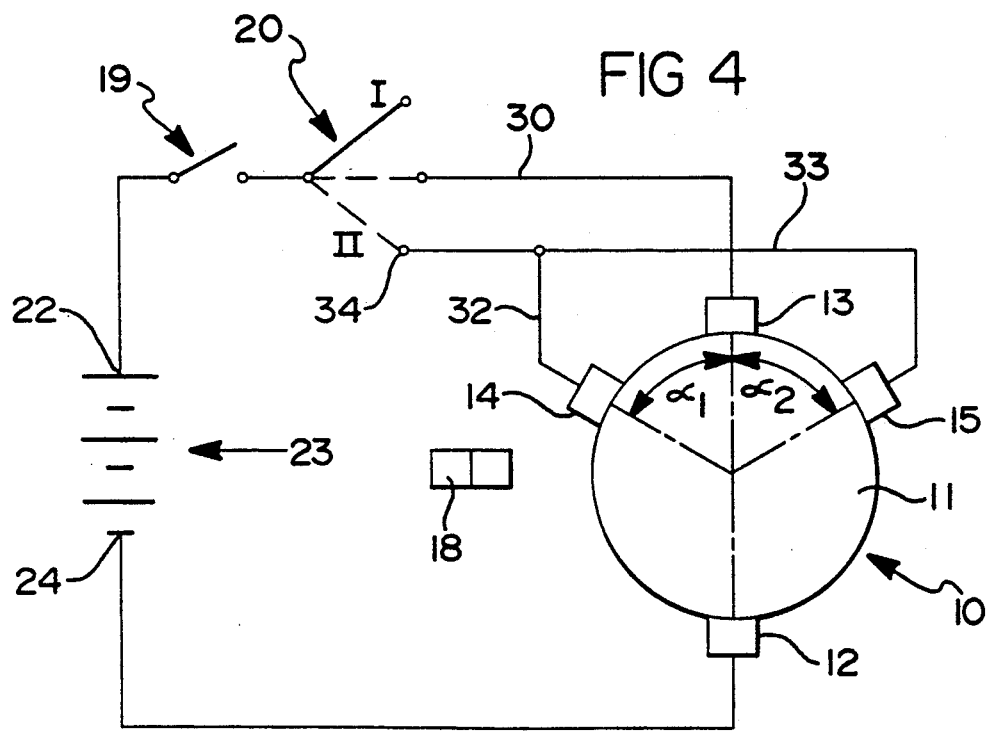
FIG. 4 is an embodiment in which the third and fourth carbon brush is narrower than the other carbon brushes.

In the embodiment according to FIG. 4 the lower current flowing through the two carbon brushes 14 and 15 results in that the carbon brushes are narrower in the circumferential direction of the collector 11 than the carbon brushes 12 and 13. This has an advantageous effect on the commutating of the current.

Figure 5:
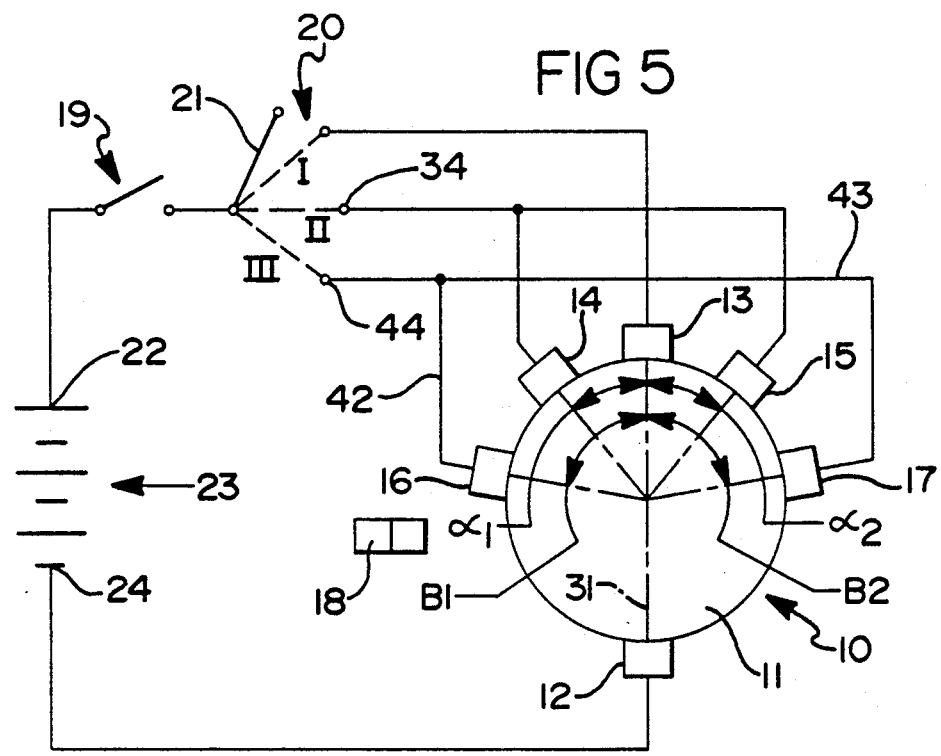
FIG. 5 is an embodiment with three speeds of operation.

The d.c. motor 10 of the windshield wiper drive mechanism shown in FIG. 5 can be operated in three speeds of operation. In addition to the brushes 12, 13, 14, and 15 two further brushes 16 and 17 are provided, which also are positioned at opposite sides of the connecting line 31 between the two carbon brushes 12 and 13 are set off relative to the carbon brush 13 at a larger angle than the carbon brushes 14 and 15. The two brushes 16 and 17 are jointly connected to an additional stationary contact 44 of the operating switch 20 by way of the supply leads 42 and 43, which operating switch therefore is provided with three operating positions. If with switched-on ignition switch 19 the movable bridging contact 21 of the operating switch 20 is changed over to the stationary contact 44, the two carbon brushes 16 and 17 are connected in parallel to each other and jointly to the positive terminal 22 of the voltage source 23. The motor is then operated in a speed of operation III with a higher speed than the speeds of operation I and II.

Figure 6:
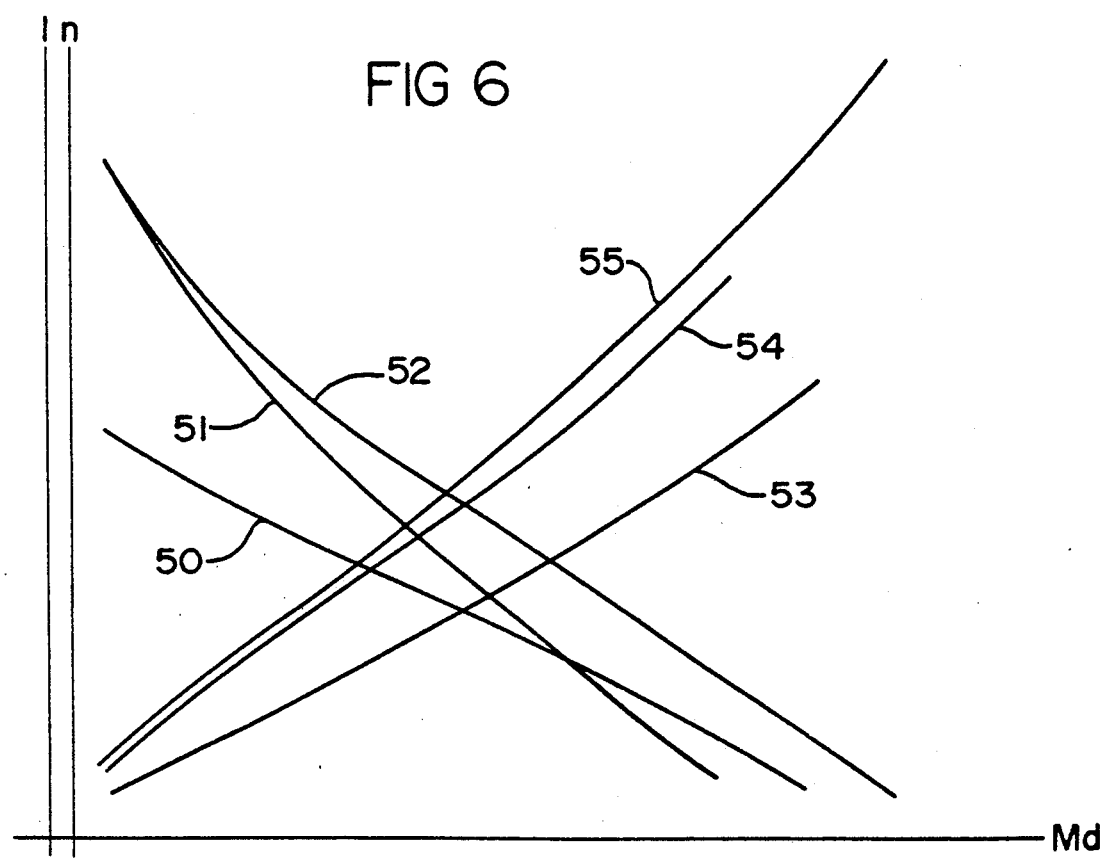
FIG. 6 is a multiple motor diagram of a drive mechanism according to the present invention.

FIG. 6 shows the diagrams of a d.c. motor of a customary drive mechanism and of a drive mechanism according to the present invention. The characteristic 50 shows the relationship between motor speed and torque in the speed of operation I. This characteristic is the same for a customary drive mechanism and according to the present invention. The characteristic 51 shows the relationship between motor speed and torque for the motor of a customary drive mechanism when operated in the speed of operation II. It can be seen that in the speed of operation II the no-load number of revolutions or speed is higher than in the speed of operation I, but the starting torque has become smaller.

The characteristic 52 shows the relationship between motor speed and motor torque for a drive mechanism according to the present invention operated with the speed of operation II, which drive mechanism in this speed of operation has two carbon brushes connected with the positive terminal of the voltage source. It can be seen that the starting torque of the motor is now higher in the speed of operation II than in the speed of operation I.

The characteristic 53 shows the current/torque relationship for a customary d.c. motor or one according to the present invention when operated in the speed of operation I. The characteristic 54 relates to the current/torque relationship of a customary d.c. motor when operated in at the speed of operation II; and the characteristic 55 to the current/torque relationship of a d.c. motor according to the present invention in the speed of operation II. It can be seen that the current drawn from a d.c. motor according to the present invention in the speed of operation II is only slightly higher than the current flowing through the d.c. motor of a customary drive mechanism when operated at the speed of operation II.

What is claimed is:

1. A drive mechanism for windshield wipers on motor vehicles comprising a d.c. motor (10) having at least two different speeds of operation, which d.c. motor comprises a collector (11), a first and a second carbon brush (12, 13) resting against the collector (11) substantially diametrical to each other, and a third carbon brush (14) which, set off relative to the second carbon brush (13) at a defined angle, rests against the collector (11) on one side between the first and second carbon brush, wherein, when the d.c. motor (10) is operated with the first speed of operation (I) the first and the second carbon brush (12, 13) are connected to a voltage source (23) and, when the d.c. motor (10) is operated in the second speed of operation (II) the first and the third carbon brush (12, 14) are connected to said voltage source, and a fourth carbon brush (15) which, relative to the third carbon brush (14) rests against the collector (11) at the other side of the connecting line (31) between the first and second carbon brush (12, 13) and is connected to the voltage source (23) in parallel to and jointly with the third carbon brush (14) and including means cooperating with said fourth carbon brush for adjusting a starting torque in the second speed of operation.

2. A drive mechanism according to claim 1, wherein the third carbon brush (14) and the fourth carbon brush (15) are set off to a different angle relative to the second carbon brush (13).

3. A drive mechanism according to claim 2, the set off of the fourth carbon brush is no greater than the set off of the after-running edge of the third carbon brush relative to the second carbon brush.

4. A drive mechanism according to claim 1, the third and the fourth carbon brush (14, 15) are set off relative to the second carbon brush (13) at the same angle.

5. A drive mechanism according to claim 1, wherein said adjusting means comprises a low electric resistance in series-connected to the fourth carbon brush (14, 15).

6. A drive mechanism according to claim 1, wherein one of the third and the fourth carbon brush (14, 15) is automatically switched off, when the d.c. motor (10) is blocked in the second speed of operation (II).

7. A drive mechanism according to claim 6, wherein the switched off operation includes a switching element (41) which is thermally operated.

8. A drive mechanism according to claim 1, wherein the third and the fourth carbon brush (14, 15) is narrower in the circumferential direction of the collector (11) than the first and the second carbon brush (12, 13).

9. A drive mechanism for windshield wipers on motor vehicles comprising a d.c. motor (10) which is driven in at least two different speeds of operation, which d.c. motor comprises a collector (11), a first and a second carbon brush (12, 13) resting against the collector (11) substantially diametrical to each other, and a third carbon brush (14) which, set off relative to the second carbon brush (13) at a defined angle, rests against the collector (11) on one side between the first and second carbon brush, wherein, when the d.c. motor (10) is operated with the first speed of operation (I) the first and the second carbon brush (12, 13) are connected to a voltage source (23) and, when the d.c. motor (10) is operated in the second speed of operation (II) the first and the third carbon brush (12, 14) are connected to said voltage source, and a fourth carbon brush (15) which, relative to the third carbon brush (14) rests against the collector (11) at the other side of the connecting line (31) between the first and second carbon brush (12, 13) and is connected to the voltage source (23) in parallel to and jointly with the third carbon brush (14), and wherein for a third speed of operation (III) there are provided two further carbon brushes (16, 17) resting against the collector (11) at opposite sides of the connecting line (31) between the first and the second carbon brush (12, 13), which carbon brushes (16, 17) are set off relative to the second carbon brush (13) to an extent which differs from that of the third and the fourth carbon brush (14, 15) and are connected in parallel and jointly to the voltage source (23).

* * * * *

UNITED STATES PATENT AND TRADEMARK OFFICE
CERTIFICATE OF CORRECTION

PATENT NO. : 5,023,532

DATED : June 11, 1991

INVENTOR(S) : Werner Gakenholz

It is certified that error appears in the above-identified patent and that said Letters Patent is hereby corrected as shown below:

On the title page, Item [86]: the U.S. filing date "May 2, 1990" should read --April 16, 1990--.

Signed and Sealed this

Sixth Day of April, 1993

Attest:

STEPHEN G. KUNIN

*Attesting Officer*       Acting Commissioner of Patents and Trademarks